United States Patent
Spencer et al.

(10) Patent No.: US 6,749,676 B2
(45) Date of Patent: *Jun. 15, 2004

(54) ERASABLE INKS, WRITING INSTRUMENTS, AND METHODS

(75) Inventors: Jean L. Spencer, Boston, MA (US); Pawel Czubarow, Wellesley, MA (US)

(73) Assignee: Berol Corporation, Freeport, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/898,396

(22) Filed: Jul. 3, 2001

(65) Prior Publication Data

US 2002/0033116 A1 Mar. 21, 2002

Related U.S. Application Data

(63) Continuation-in-part of application No. 09/608,925, filed on Jul. 3, 2000, now abandoned.

(51) Int. Cl.$^7$ .............................................. C09D 11/13
(52) U.S. Cl. ................. 106/31.64; 106/31.9; 106/31.65; 106/415; 106/472; 106/403
(58) Field of Search ........................... 106/31.64, 31.65, 106/31.9, 415, 472, 403

(56) References Cited

U.S. PATENT DOCUMENTS

| | | | |
|---|---|---|---|
| 1,629,250 A | 5/1927 | Bittinger | 106/31.28 |
| 2,833,736 A | 5/1958 | Glaser | 260/29.6 |
| 2,956,038 A | 10/1960 | Juelss et al. | 260/33.6 |
| 3,087,828 A | 4/1963 | Linton | 106/291 |
| 3,425,779 A | 2/1969 | Fisher et al. | 401/190 |
| 4,552,593 A | 11/1985 | Ostertag | 106/291 |
| 4,623,396 A | 11/1986 | Kimura et al. | 106/291 |
| 4,652,388 A | 3/1987 | Gold | 252/62.54 |
| 4,687,791 A * | 8/1987 | Miyajima et al. | 106/31.64 |
| 4,705,300 A | 11/1987 | Berning et al. | 283/91 |
| 4,705,356 A | 11/1987 | Berning et al. | 350/166 |
| 4,762,875 A | 8/1988 | Gold | 524/248 |
| 4,779,898 A | 10/1988 | Berning et al. | 283/58 |
| 5,091,010 A | 2/1992 | Souma et al. | 106/403 |
| 5,213,618 A | 5/1993 | Souma et al. | 106/403 |
| 5,252,522 A | 10/1993 | Dorbath et al. | 501/19 |
| 5,271,771 A | 12/1993 | Franz et al. | 106/474 |
| 5,364,467 A | 11/1994 | Schmid et al. | 106/404 |
| 5,445,671 A | 8/1995 | Herget et al. | 106/20 R |
| 5,474,603 A | 12/1995 | Miyashita et al. | 106/25 R |
| 5,540,769 A | 7/1996 | Franz et al. | 106/415 |
| 5,556,527 A | 9/1996 | Igarashi et al. | 204/488 |
| 5,565,024 A | 10/1996 | Schraml-Marth | 106/415 |
| 5,569,535 A | 10/1996 | Phillips et al. | 428/403 |
| 5,573,584 A | 11/1996 | Ostertag et al. | 106/417 |
| 5,585,189 A | 12/1996 | Inoue et al. | 428/461 |
| 5,624,076 A | 4/1997 | Miekka et al. | 241/3 |
| 5,624,487 A | 4/1997 | Schmidt et al. | 106/417 |
| 5,626,661 A | 5/1997 | Schmid et al. | 406/415 |
| 5,672,410 A | 9/1997 | Miekka et al. | 428/148 |
| 5,741,355 A | 4/1998 | Yamamoto et al. | 106/417 |
| 5,753,325 A | 5/1998 | McDaniel | 428/34.7 |
| 5,762,694 A | 6/1998 | Yokoi et al. | 106/31.65 |
| 5,785,746 A | 7/1998 | Kito et al. | 106/31.86 |
| 5,873,934 A | 2/1999 | Kunii et al. | 106/417 |
| 5,958,123 A | 9/1999 | De La Fuente | 106/31.69 |
| 6,056,815 A | 5/2000 | Fu | 106/417 |
| 6,083,311 A | 7/2000 | Kanbayashi et al. | 106/31.65 |
| 6,099,629 A | 8/2000 | Morita et al. | 106/31.6 |
| 6,120,590 A | 9/2000 | Miyamoto et al. | 106/31.6 |
| 6,171,381 B1 | 1/2001 | Yoshimura et al. | 106/31.6 |
| 6,241,858 B1 | 6/2001 | Phillips et al. | 204/192.15 |
| 6,306,930 B1 | 10/2001 | Tsujio | 523/161 |
| 6,325,845 B1 | 12/2001 | Kurihara et al. | 106/31.68 |
| 2001/0036980 A1 | 11/2001 | Tsujio | 523/161 |

FOREIGN PATENT DOCUMENTS

| | | |
|---|---|---|
| DE | 1 135 117 | 8/1962 |
| DE | 38 25 702 A1 | 1/1990 |
| DE | 41 41 069 A1 | 6/1993 |
| DE | 42 40 366 A1 | 6/1994 |
| EP | 0 600 205 A1 | 6/1994 |
| EP | 633 299 A | 1/1995 |
| EP | 0 686 675 B1 | 12/1995 |
| EP | 761 785 A2 | 3/1997 |
| EP | 0 787 779 A2 | 8/1997 |
| EP | 0 960 911 | 12/1999 |
| EP | 0 558 916 B1 | 4/2000 |
| EP | 1 006 162 A1 | 6/2000 |
| EP | 1 038 931 A1 | 9/2000 |

(List continued on next page.)

OTHER PUBLICATIONS

Dobrowolski et al., "Optical interference coatings for inhibiting of counterfeiting" *Optica Acta*, 20(12):925–937 (1973), no month available.

Emmert, "Instrumentation Color Matching of Pearlescent Pigments," *Cosmetics & Toiletries*, 104(7) Jul. 1989.

Greenstein, "Nacreous (Pearlescent) Pigments," *Pigment Handbook*, John Wiley & Sons, vol. 1, pp. 871–890 (1973), no month available.

Rona Product Brochure, EM Industries, Inc. Chemicals & Pigments Division (1996), no month available.

International Search Report for PCT/US01/21025 In the name of Berol Corporation, Jan. 2002.

Sommer et al., "Metal effect pigments" *Verfksroniek*, 71(11):25–28 (1998).

Written Opinion dated Jul. 22, 2002, for International Application No. PCT/US01/21025.

International Preliminary Examination Report dated Nov. 18, 2002, for International Application No. PCT/US01/21025.

*Primary Examiner*—Mark L. Bell
*Assistant Examiner*—Veronica F. Faison
(74) *Attorney, Agent, or Firm*—Marshall, Gerstein & Borun LLP

(57) ABSTRACT

Erasable inks are provided for use in a writing instruments. In one aspect, the inks include a solvent, and, dispersed in the solvent as a colorant, a pigment having a flake-like morphology, the ink being substantially free of other colorants.

30 Claims, No Drawings

FOREIGN PATENT DOCUMENTS

| | | |
|---|---|---|
| EP | 1 045 014 A2 | 10/2000 |
| EP | 1 111 018 A1 | 6/2001 |
| GB | 974123 | 11/1964 |
| GB | 1192920 | 5/1970 |
| JP | 54-19806 | 2/1979 |
| JP | 54-148605 | 11/1979 |
| JP | 56-139571 | 10/1981 |
| JP | 58-17171 | 2/1983 |
| JP | 60-170676 | 9/1985 |
| JP | 61-106681 | 5/1986 |
| JP | 61-130384 | 6/1986 |
| JP | 62-28834 | 6/1987 |
| JP | 03-027999 | 2/1991 |
| JP | 05-117569 | 5/1993 |
| JP | 05-295048 | 11/1993 |
| JP | 06-299114 | 10/1994 |
| JP | 06-313142 | 11/1994 |
| JP | 07-118592 | 5/1995 |
| JP | 08-010691 | 1/1996 |
| JP | 09-188830 | 7/1997 |
| JP | 09-268270 | 10/1997 |
| JP | 10-067946 | 3/1998 |
| JP | 10-067948 | 3/1998 |
| JP | 10-158540 | 6/1998 |
| JP | 10-158541 | 6/1998 |
| JP | 10-259316 | 9/1998 |
| JP | 10-259317 | 9/1998 |
| JP | 10-279828 | 10/1998 |
| JP | 11-076868 | 3/1999 |
| JP | 11-080629 | 3/1999 |
| JP | 11-130998 | 5/1999 |
| JP | 11-148042 | 6/1999 |
| JP | 11-360187 | 12/1999 |
| JP | 2000-26783 | 1/2000 |
| JP | 2000-002344 | 1/2000 |
| JP | 2000-002370 | 1/2000 |
| JP | 2000-071999 | 3/2000 |
| JP | 2000-072995 | 3/2000 |
| JP | 2000-103997 | 4/2000 |
| JP | 2000-119579 | 4/2000 |
| JP | 2000-282779 | 9/2000 |
| JP | 2000-345096 | 12/2000 |
| JP | 2001-026730 | 1/2001 |
| JP | 2001-72909 | 3/2001 |
| JP | 2001-72995 | 3/2001 |
| JP | 2001-080263 | 3/2001 |
| JP | 2001-081382 | 3/2001 |
| SU | 1654406 A | 6/1991 |
| WO | WO 93/12182 | 6/1993 |
| WO | WO 94/17146 | 8/1994 |
| WO | WO 95/15361 | 6/1995 |
| WO | WO 96/17025 | 6/1996 |
| WO | WO 97/35935 | 10/1997 |
| WO | WO 98/26014 | 6/1998 |
| WO | WO 98/40441 | 9/1998 |

* cited by examiner

ERASABLE INKS, WRITING INSTRUMENTS, AND METHODS

This is a continuation-in-part of U.S. patent application Ser. No. 09/608,925, filed Jul. 03, 2000 now abandoned, the entire disclosure of which is herein incorporated by reference.

TECHNICAL FIELD

This invention relates to erasable inks, and more particularly to erasable inks for use in writing instruments.

BACKGROUND

Some writing instruments, e.g., pens and markers, include erasable inks which allow markings formed with the ink to be erased. It is desirable that such inks be easily erased using a conventional eraser, that erasure be substantially complete, and that it be possible to erase the marking both immediately after the marking is made and after a period of time has elapsed. It is also desirable that erasable inks provide good writing performance when compared with non-erasable inks.

SUMMARY

This invention provides erasable inks that provide good writing performance when used in writing instruments.

In accordance with one aspect of the invention, an erasable ink for use in a writing instrument comprises a solvent and a pigment having a flake-like morphology. The pigment is dispersed in the solvent, and the ink is substantially free of colorants other than the pigment.

In accordance with another aspect of the invention, an erasable ink for use in a writing instrument comprises a solvent and a flake-like pigment. The pigment has an average diameter from about 1 micron to about 25 microns, and is dispersed in the solvent.

In accordance with another aspect of the invention, an erasable ink for use in a writing instrument comprises a solvent and a flake-like pigment. The pigment has an average thickness of less than about 1 micron, and is dispersed in the solvent.

In accordance with an additional aspect of the invention, a method of forming an erasable marking on a paper substrate comprises making a marking on the substrate with a writing instrument containing an erasable ink. The erasable ink comprises a solvent and a pigment having a flake-like morphology. The pigment is dispersed in the solvent, and the ink is substantially free of colorants other than the pigment.

In accordance with yet another aspect according to the invention, a method of forming an erasable marking on a paper substrate comprises making a marking on the substrate with a writing instrument containing an erasable ink. The erasable ink comprises a solvent and a flake-like pigment. The pigment has an average diameter from about 1 micron to about 25 microns, and is dispersed in the solvent.

In accordance with another aspect according to the invention, a method of forming an erasable marking on a paper substrate comprises making a marking on the substrate with a writing instrument containing an erasable ink. The erasable ink comprises a solvent and a flake-like pigment. The pigment has an average thickness of less than about 1 micron, and is dispersed in the solvent.

In accordance with yet another aspect according to the invention, a writing instrument comprises a reservoir containing an erasable ink. The erasable ink comprises a solvent and a pigment having a flake-like morphology. The pigment is dispersed in the solvent, and the ink is substantially free of colorants other than the pigment.

In accordance with another aspect according to the invention, a writing instrument comprises a reservoir containing an erasable ink. The erasable ink comprises a solvent and a flake-like pigment. The pigment has an average diameter from about 1 micron to about 25 microns, and is dispersed in the solvent.

In accordance with another aspect according to the invention, a writing instrument comprises a reservoir containing an erasable ink. The erasable ink comprises a solvent and a flake-like pigment. The pigment has an average thickness of less than about 1 micron, and is dispersed in the solvent.

These and other features, aspects, and advantages of the invention will become better understood with regard to the following description and appended claims.

DETAILED DESCRIPTION

This invention provides erasable inks for use in writing instruments. Erasability can be obtained by using pigments having a flake-like morphology as the primary colorant in the ink. In preferred inks, such pigments are the only colorant in the ink, i.e., the ink is substantially free of dyes, and of pigments having a non-flake-like morphology, as these colorants will tend to interfere with erasability.

Some preferred inks are also shear-thinning, i.e., the inks are non-Newtonian liquids that exhibit shear-thinning flow behavior when subjected to shear. Preferred shear-thinning inks of the invention become thin, readily flowable liquids having a viscosity of no greater than about 1000 mPa sec at shear rates greater than about 100 $\sec^{-1}$.

In one aspect, the invention features an erasable ink for use in a writing instrument including a solvent, and, dispersed in the solvent as a colorant, a pigment having a flake-like morphology, the ink being substantially free of other colorants.

Implementations of this aspect of the invention may include one or more of the following features. The pigment is a pearlescent pigment. The pigment is selected from the group consisting of mica flake pigments, graphites, and metal flake pigments. The pigment has a radius of gyration of at least about 0.5 micron. The ink exhibits an erasability of at least 80%. The solvent includes an aqueous solvent system. The ink is shear-thinning. The ink has a shear-thinning index of between about 0.01 and about 0.8.

In another aspect, the invention features an erasable ink for use in a writing instrument, including a solvent and, dispersed in the solvent as a colorant, a pigment having a radius of gyration of at least about 0.5 micron.

Implementations of this aspect of the invention may include one or more of the following features. The pigment is a pearlescent pigment. The pigment is selected from the group consisting of mica flake pigments, graphites, and metal flake pigments. The ink exhibits an erasability of at least 80%. The solvent includes an aqueous solvent system. The ink is shear-thinning. The ink has a shear-thinning index of between about 0.01 and about 0.8.

In a further aspect, the invention features an erasable ink for use in a writing instrument, including a solvent and, dispersed in the solvent as a colorant, a pigment having an aspect ratio of from about 1 to about 8.

Implementations of this aspect of the invention may include one or more of the following features. The pigment is a pearlescent pigment. The pigment is selected from the group consisting of mica flake pigments, graphites, and metal flake pigments. The pigment has a radius of gyration of at least about 0.5 micron. The ink exhibits an erasability of at least 80%. The solvent includes an aqueous solvent system. The ink is shear-thinning. The ink has a shear-thinning index of between about 0.01 and about 0.8.

When used in a writing instrument, preferred inks exhibit even laydown and good line intensity, e.g., a line intensity greater than about 25 percent, more preferably greater than about 30 percent, good line uniformity, and good writing performance.

As used herein, the term "laydown" refers to the amount of ink that is deposited on a substrate when making a marking of a particular length. Typical laydown for the preferred pearlescent inks is between about 0.1 mg/m and about 15.0 mg/m; preferably, between about 1.0 mg/m and about 12.0 mg/m; and most preferably, between about 5.0 mg/m and about 10.0 mg/m.

As used herein, the term "even laydown" refers to the morphology of the ink when it is applied to a substrate to create a continuous marking and is characterized by minimal skipping, i.e., few voids within the written line, and uniform thickness, i.e., the width of the written line is approximately constant along the length of the line.

As used herein, the term "line intensity" refers to the intensity of a marking made on a substrate such as paper. The intensity of a marking can be measured as the average gray value of the detected tracings (black=0; white=255). The percent intensity of the writing with an average gray value of z is then calculated as: % Intensity=$(1-[z/255])$ multiplied by 100. Alternatively, the intensity of a marking can be determined by calculating the difference between the recorded reflectance of the substrate without any marking ("Blank Reflectance") and the reflectance of the marking on the substrate ("Reflectance of Marking"). According to this method, the percent intensity of a marking is calculated by normalizing the calculated intensity difference to the Blank Reflectance and multiplying this value by 100. A black standard has an intensity of marking equal to 100%. The data obtained from these two methods are comparable.

As used herein, the term "line uniformity" refers to the standard deviation of the line intensity measured along different portions of a marking made on a substrate. Line uniformity can be used as a measure of even laydown.

Preferred erasable inks include a flake-like pigment dispersed in an aqueous solvent system.

Typically, the inks include from about 1 weight percent to about 50 weight percent of the flake-like pigment in accordance with the invention, and from about 30 weight percent to about 99 weight percent of the aqueous solvent system. Preferably, the inks include from about from about 3 weight percent to about 25 weight percent of the flake-like pigment, and from about 60 weight percent to about 96 weight percent of the aqueous solvent system. More preferably, the inks include from about 5 weight percent to about 20 weight percent of the flake-like pigment, and from about 74 weight percent to about 94 weight percent of the aqueous solvent system.

Typically, the erasable inks exhibit an erasability greater than about 80 percent. Preferably, the shear-thinning inks exhibit an erasability greater than about 90 percent. Most preferably, the shear-thinning ink exhibits an erasability greater than 95 percent. Typically, the erasable inks exhibit a line intensity greater than about 25 percent. More preferably, the erasable inks exhibit a line intensity greater than about 30 percent. Most preferably, the erasable inks exhibit a line intensity greater than about 40 percent Flake-like Pigments The morphology of the pigment is selected to provide good erasability and writing properties. The pigment morphology can be defined by the radius of gyration of the pigment particles, i.e., the radius of an imaginary sphere that is defined by rotating a sheet-like particle about its center of gravity, and by the dimensions of the particles. Preferably, the pigment particles have a radius of gyration of from about 0.5 micron to 12.5 microns, more preferably about 1.0 micron to 7.5 microns.

The average dimensions of the pigment particles can be ascertained by performing scanning electron microscopy (SEM). Preferred pigments typically have an average thickness of less than about 3 microns; preferably, the pigments have an average thickness of less than about 1 micron; more preferably, the pigments have an average thickness of less than about 0.5 microns; and, most preferably, the pigments have an average thickness of less than about 0.25 micron. Further, most preferably, the pigments have an average thickness from about 0.1 micron to 1 micron. Typically, the pigments have an average diameter of from about 1 micron to about 25 microns; preferably, the pigments have an average diameter from about 2 microns to about 15 microns; more preferably, the pigments have an average diameter from about 3 microns to about 12 microns.

The dimensions of the pigment particles can also be described by an aspect ratio of the length to the width. The average length and average width can be the same or different. Typically, the average width of the pigment particles is less than the average length. An aspect ratio of the length to the width, typically, is between about 1 and about 8; preferably, between about 1 and about 5; more preferably, between about 1 and about 3; and most preferably, between about 1 and about 2.

In general, the largest dimension of the pigment particles is limited by the need for the pigment particles to pass through the point openings in writing instruments and by the requirement that the pigment particles form stable suspensions that do not settle over time. The smallest dimension of the pigment particles is selected to limit penetration of the particles into the interstices of the substrate material. The flake-like morphology of the pigment particles results in a "leafing" phenomenon wherein the particles lie flat and align horizontally on the surface of the substrate material, overlapping each other, without penetrating into the interstices of the substrate. Such leafing particles are easily erased, whereas particles in the interstices generally are not.

Suitable pigments include mica pigments, e.g., metal oxide-coated mica-based pearlescent pigments, other types of flake-like pearlescent pigments, graphites having a flake-like morphology, glass flake pigments, and metal flake pigments.

Suitable mica flake pigments include, for example, Black Mica (iron oxide, titanium dioxide/mica), Micronasphere M (silica/mica), Colorona Blackstar Blue (iron oxide/mica), Microna Matte Blue (ferric ferrocyanide/mica), and Afflair 110 (titanium dioxide/mica), available from EM Industries, Inc., Hawthorne, N.Y.

Suitable metal oxide-coated micas, also referred to as "nacreous" pigments, are described in, e.g., U.S. Pat. No. 3,087,828, the disclosure of which is incorporated herein by reference. A suitable mica phase for use in such pigments is Illite (JCPDS card #26-0911). Suitable metal oxides for use in nacreous pigments include titanium dioxide, chromium oxide, cobalt oxide, nickel oxide, tin oxide and iron oxide.

A suitable iron oxide is hematite. Nacreous pigments which provide a pearlescent effect, referred to herein as "pearlescent pigments" are commercially available. Preferred pearlescent pigments include products sold under the trade names Afflair (EM Industries, Inc., Hawthorne, N.Y.); Timiron, Colorona, Soloron, Dichrona, and Biron (the Rona division of EM Industries, Inc., Hawthorne, N.Y.); Mearlin, Cellini, Timica, Duocrome, and Mearlite Engelhard Corporation, Iselin, N.J.); Flonac (Presperse, Inc., Piscataway, N.J.); and Firemax (Rocky Mountain International, Denver, Colo.).

Other suitable pearlescent pigments, referred to as combination pigments, are created by precipitating other pigments or dyes on top of or simultaneously with the original oxide layer. Examples of these materials include iron oxide ($Fe_2O_3$ or $Fe_3O_4$), chromic oxide ($Cr_2O_3$), cobalt titanate ($CoTiO_3$), aluminum oxide, silica, ferric ferrocyanide, iron blue, carmine, and D&C Red 30. Combination pigments produce colors which are a mixture of both interference and absorption effects. When the absorption color (arising from the mass tone of the inorganic or organic colorant) is the same as the interference color, the resulting pearlescent pigment has a rich, brilliant color. When the absorption color is different from the interference color, the resulting pigment has a dual-color, or two-tone, effect. In this situation, the color observed varies according to the viewing angle, with the interference color being seen at the specular angle and the absorption color being seen at all other angles. These pigments are referred to as "dichromatic pigments." Such pigments are commercially available from the Rona division of EM Industries under the trade names Dichrona and Colorona.

Two or more pearlescent pigments of different or the same colors can be mixed to obtain desired color effects. If the pigments derive color from interference alone, then the colors mix additively, e.g., blue and yellow does not yield green, but instead yields white or a lighter blue or yellow, depending on the ratio of blue to yellow pigment. Thus, if a blue interference pigment is a more intense blue than desired, a yellow interference pigment can be added to adjust the color. Combining a blue interference pigment with a second blue pigment that derives color from both interference and absorption can result in a mixture that is brilliant blue.

Pearlescent pigments can also be mixed with non-pearlescent pigments. In most cases, the color that will result is determined empirically. However, in the case of mixing pearlescent pigments with a black pigment, e.g., black mica pigment composed of mica, titanium dioxide, and black iron oxide, the color results can be predicted.

For example, if the pearlescent pigment is a violet interference pigment which is mixed with the black, the color is perceived as becoming more intensely violet as the black absorbs scattered light. If the pearlescent pigment is a two-tone pigment which is mixed with the black, the color is perceived as changing from a two-tone effect (with the absorption pigment the predominant color) to a color dominated by the interference color as the black absorbs the scattered light from the absorption pigment. For a red/blue pearlescent pigment (carmine with a titanium dioxide layer), the perceived color changes from a purplish pink to an intense bluish purple as the black is added. Similarly, if the pearlescent pigment has an oxide layer that produces both an interference color and an absorption color, addition of a black pigment causes the mixture to change to a color dominated by the interference color. Addition of black to a red pearlescent pigment (red iron oxide layer) is perceived as changing color from brownish red to reddish purple.

Additional examples of suitable color combinations are disclosed in commonly assigned co-pending application U.S. Ser. No. 09/609,811, entitled "Pearlescent Inks," and also, in a continuation-in-part application of U.S. Ser. No. 09/609,811, entitled "Pearlescent Inks, Writing Instruments, and Methods," the disclosures of which are incorporated herein by reference.

Suitable non-mica-based pearlescent pigments include natural pearl essence (guanine/hypoxanthine crystals from fish scales), basic lead carbonate, lead hydrogen arsenate, and bismuth oxychloride pigments. Suitable bismuth oxychloride flakes include, for example, Biron ESQ and Biron LF-2000, also available from EM Industries, Inc.

Suitable graphite particles include, but are not limited to, amorphous graphite, flake natural graphite, primary synthetic graphite, and secondary synthetic graphite. Primary and secondary synthetic graphite particles are synthetically produced and purified particles, whereas amorphous and flake graphite particles are naturally occurring. Preferably, the graphite particles are flake natural graphite. Examples of suitable graphite particles include, but are not limited to, those sold under the trade names, Micro750 and Micro790 (flake), Micro150 and Micro190 (amorphous), Micro250 and Micro290 (primary synthetic), and Micro450 and Micro490 (secondary synthetic), available from Graphite Mills, Inc. (Asbury Graphite Mills, N.J.)

Suitable metal flake pigments are described, e.g., in U.S. Pat. Nos. 5,762,694, 5,474,603, and GB Patent No. 974,123, the disclosures of which are incorporated herein by reference. Suitable aluminum flakes include, for example, Metalure, Alucolor (organic pigment/aluminum), and Aloxal (aluminum with oxidized surface), available from Eckart America, L. P., Painesville, Ohio. Metal-coated glass flake pigments may also successfully be used in the inks according to the invention.

It is preferred that the inks be substantially free of colorants that lack the flake-like morphology described above, e.g., pigments that have non-flake-like morphologies and dyes. Such colorants will tend to stain (in the case of dyes) or become entrapped by (in the case of pigments) paper substrates, and thus may deleteriously affect erasability. By "substantially free", it is meant that the preferred inks do not contain an amount of such colorants that would deleteriously affect erasability. In general, preferred inks contain less than 0.1 percent by weight of such colorants.

Shear-thinning Additive:

Some preferred inks also include a shear-thinning additive, to render the ink shear-thinning. Suitable shear-thinning additives are miscible or dispersible in the aqueous solvent along with the dispersed pigment particles. An erasable, shear-thinning pearlescent ink typically has a shear-thinning index (n) between about 0.01 and about 0.8, preferably between about 0.05 and about 0.60, and most preferably between about 0.1 and about 0.3. The shear-thinning index (n) is determined by fitting the shear stress ($\Sigma$) and shear rate ($\gamma$) values obtained from rheological measurements to the empirical power law equation: $\tau = K\gamma^n$ wherein the coefficient (K) is a constant. The exact value of K depends on the composition being tested. The shear-thinning index is also described in U.S. Pat. No. 4,671,691, the disclosure of which is incorporated herein by reference. Shear stress values are measured continuously from 0.5 $sec^{-1}$ to 1000 $sec^{-1}$ and are fit to the power law model to determine the shear-thinning index. Shear-thinning measurements can be performed on a rheometer, such as a Carri-Med Rheometer $CSL^2$-500, available from TA Instruments, located in New Castle, Del.

Suitable shear-thinning additives provide erasable, shear-thinning inks that are thickened viscous liquids at rest or at low shear rates. In general, the viscosity decreases as the shear rate increases. Typically, erasable, shear-thinning pearlescent inks have a viscosity between 200 mPa·sec and 20,000 mPa·sec at a shear rate of about 1.0 sec$^{-1}$; preferably, the shear-thinning pearlescent inks have a viscosity between 1000 mPa·sec and 18,000 mPa·sec at a shear rate of about 1.0 sec$^{-1}$; and, most preferably, the shear-thinning pearlescent inks have a viscosity between 2000 mPa·sec and 15,000 mPa·sec at a shear rate of about 1.0 sec$^{-1}$. Typically, erasable, shear-thinning pearlescent inks have a viscosity between 10 mPa·sec and 1000mPa·sec at ashear rate of 100 sec$^{-1}$; preferably, the shear-thinning pearlescent inks have a viscosity between 30 mPa·sec and 700 mPa·sec at a shear rate of 100 sec$^{-1}$; and, most preferably, the shear-thinning pearlescent inks have a viscosity between 50 mPa·sec and 500 mPa·sec at a shear rate of 100 sec$^{-1}$. As a result, the shear-thinning additives provide an erasable, shear-thinning pearlescent ink having a shear-thinning index (n) between about 0.01 and about 0.8, a viscosity greater than 200 mPa·sec at a shear rate of about 1.0 sec$^{-1}$, and a viscosity less than about 1000 mPa·sec at shear rates above 100 sec$^{-1}$.

Suitable shear-thinning additives do not interact to any significant extent with the substrate materials, e.g., paper, on which the erasable, shear-thinning pearlescent ink is used, in a manner that would deleteriously affect erasability. Suitable shear-thinning additives include, but are not limited to, clays, such as smectites (bentonite and hectorite), and to organoclays, typically smectites modified with long-chain organic cation groups. The term "smectite" refers to a family of non-metallic clays that are primarily composed of hydrated sodium calcium aluminum silicate, including bentonite and hectorite. Common names for smectites include montmorillonite or sodium montmorillonite ("sodium bentonite" or "Wyoming bentonite") and swelling bentonite ("Western bentonite"). Bentonite is a native, colloidal, hydrated, non-metallic mineral of the dioctahedral smectite group, is primarily composed of the mineral montmorillonite, and has been processed to remove grit and non-swellable ore components. Hectorite is a native, colloidal mineral of the trioctahedral smectite group and is primarily composed of sodium magnesium lithium silicate. Typically, hectorite is processed to remove grit and impurities. Clays, such as Bentone Mass., and organoclays, such as Bentone 34, are available from Rheox Inc., Hightstown, N.J.

Other suitable shear-thinning additives include water-dispersible gums or resins which can be either natural or synthetic. Natural gums include seaweed extracts, plant exudates, seed or root gums and microbiologically fermented gums. Synthetic gums, such as modified versions of cellulose or starch, include propylene glycol alginate, carboxymethyl locust bean gum and carboxymethyl guar. Many water-dispersible gums can also be described as polysaccharides, because their structure consists of repeating sugar units. Examples of water-dispersible gums include, but are not limited to, xanthan gum (Keltrol and Kelzan made by Kelco Biopolymers, San Diego, Calif.), carboxymethylcellulose (sold as a sodium salt, Blanose, by Hercules Incorporated, Wilmington, Del.), hydroxyethylcellulose (Natrosol, manufactured by Hercules; Cellosize, by Union Carbide Corporation, Danbury, Conn.), sodium alginate and other salts of alginic acid, kappa, iota and lambda carrageenan (sulfated polysaccharides extracted from red seaweed), gum arabic (mixed salts of arabic acid), gum karaya (an acetylated polysaccharide), gum tragacanth (a complex mixture of acidic polysaccharides), gum ghatti (the calcium and magnesium salt of a complex polysaccharide), guar gum (a straight chain galactomannan) and its derivatives (Jagar, manufactured by Rhodia, Inc., Cranbury, N.J.), locust bean gum (a branched galactomannan), tamarind gum, psyllium seed gum, quince seed gum, larch gum, pectin and its derivatives, dextran, hydroxypropylcellulose (Klucel, manufactured by Hercules), cellulose ethers (Methocel, manufactured by Dow Chemical Company, Midland, Mich.) and other water-soluble gums of this type.

Other suitable shear-thinning additives include high molecular weight homo- and copolymers of acrylic acid crosslinked with polyalkenyl polyether sold by BFGoodrich, Charlotte, N.C., under the trade name Carbopol, e.g., Carbopol 934, 940, and 941. Carbopol homopolymers are polymers of acrylic acid crosslinked with allyl sucrose or allylpentaerythritol, and Carbopol copolymers are polymers of acrylic acid modified by long-chain (C10–C30) alkyl acrylates and crosslinked with allylpentaerythritol. Carbopol polymers, also called Carbomers, typically have high molecular weights between about 350,000 and 5,000,000.

Typically, the inks include from about 0.01 weight percent to about 10.0 weight percent of the shear-thinning additive; preferably, the inks include from about 0.05 weight percent to about 5 weight percent of the shear-thinning additive; and most preferably, from about 0.1 weight percent to about 2 weight percent of the shear-thinning additive.

Aqueous Solvent System

The aqueous solvent system of the erasable ink is a polar solvent system in which water is the primary solvent. The aqueous solvent system can consist of water alone, but other water-soluble organic solvents which are useful in inhibiting drying in the point of the writing instrument and in preventing the ink from freezing at low temperatures can be included in the aqueous solvent system. Typically, the erasable ink includes from 1 percent by weight to 40 percent by weight of a water-soluble organic solvent. Preferably, the erasable ink includes 5 percent by weight to 30 percent by weight of a water-soluble organic solvent. Most preferably, the erasable ink includes about 8 percent by weight to 25 percent by weight of a water-soluble organic solvent. If too much water-soluble organic solvent is added to the erasable ink, the written marks take longer to dry, have worse erasability, exhibit poorer writing characteristics (uneven line intensity), and the solubility of the shear-thinning agent in the formulation may be affected.

Dispersants

Additionally, the density and the size of the pigment particles in the erasable writing composition necessitate the use of one or more effective dispersants to disperse the particles into the ink. Typically, such dispersants are water-soluble polymers that include polymeric chains having "anchoring groups" which may or may not carry a charge, and which are attracted to the pigment and/or pigment particulate surface. When the unbound portion of the polymeric chain is well solvated, it helps to stabilize the dispersion of particles in the solvent system. Dispersants are also used to reduce the drying times of the erasable, shear-thinning composition. Typically, the erasable ink includes about 0.01 percent by weight and 5 percent by weight of one or more suitable dispersants; preferably, between about 0.02 percent by weight and 4 percent by weight of one or more dispersants; and most preferably, between about 0.05 percent by weight and 2 percent by weight of one or more dispersants. Compositions not containing sufficient amounts of one or more dispersants may show poor writing performance (reduced or no flow from the point), and may exhibit poor stability with time and/or elevated temperature.

Examples of suitable dispersants include, but are not limited to, nonionic copolymers such as Disperbyk-192 (BYK-Chemie USA, Wallingford, Conn.), anionic copolymers such as Disperbyk-190 and Disperbyk-191 (BYK-Chemie USA, Wallingford, Conn.), anionic phosphated alkoxylated polymers such as Solsperse 40000 and Solsperse 41090 (Avecia Pigments & Additives, Charlotte, N.C.), anionic dimethicone copolyol phosphates such as Pecosil PS-100 and Pecosil PS-150 (Phoenix Chemical, Inc., Somerville, N.J.) and other polymers such as Zephrym PD2434, Zeplrym PD2630, Zephrym PD2678, and Zephrym PD3076, available from Uniquema, Wilmington, Del.

Wetting Agents

In order to produce a consistent written line, the formulation must readily wet the ball of the writing instrument. Furthermore, the formulation must also wet the paper so that written marks dry fast by absorption of the solvent into the paper. Preferred wetting agents can be either anionic or nonionic. Typically, the erasable ink includes about 0.01 percent by weight to about 5 percent by weight of one or more suitable wetting agents; preferably, the erasable ink includes about 0.02 percent by weight to about 4 percent by weight of one or more wetting agents; and most preferably, the erasable ink includes between about 0.05 percent by weight and about 2 percent by weight of one or more wetting agents.

Examples of suitable wetting agents include, but are not limited to, anionic phosphate esters such as Ethfac 324 and Ethfac 361 (Ethox Chemical, LLC, Greenville, S.C.), anionic sulfosuccinates such as Emcol 4100M (Witco Corporation, Greenwich, Conn.) and Triton GR-5M (Union Carbide Corporation, Danbury, Conn.), nonionic ethoxylated fatty acids such as Emerest 2634 and Emerest 2646 (Cognis Corporation, Cincinnati, Ohio), nonionic ethoxylated alcohols such as Brij 58, Brij 98, Renex 20, Renex 36 and Synthrapol KB (Uniquema, Wilmington, Del.), and nonionic polyether-modified polydimethylsiloxanes such as BYK-345, BYK-348, BYK-307 and BYK-333 (BYK-Chemie USA, Wallingford, Conn.).

Preservatives

Erasable inks thickened with polysaccharide gums require the use of one or more preservatives to prevent the growth of bacteria and fungi. The preferred agent is a broad-spectrum biocide, 1,2,-benzisothiazolin-3-one, sold as a solution or dispersion under the trade name Proxel. Examples of suitable preservatives include, but are not limited to, Proxel GXL, Proxel BD20, and Proxel XL2 (Avecia Biocides, Wilmington, Del.) Typically, the erasable inks according to the invention can include 0.01 percent by weight to 0.05 percent by weight of the active ingredient in the preservative product. Other preservatives include, but are not limited to, potassium sorbate, sodium benzoate, pentachlorophenyl sodium, and sodium dihydroacetate.

Other Additives

The erasable inks according to the invention can also include other additives that are well-known in the art, such as defoamers, corrosion inhibitors, and lubricants.

Additionally, the pH of the composition can be adjusted to increase the stability and writing characteristics of the writing composition. For example, the stability of erasable inks may be enhanced by adjusting the pH of the composition to between about 5 and about 9, e.g., by adding an acid or a base. More preferably, the pH of the erasable writing composition is between about 7 and about 9 and, most preferably, the pH of the erasable ink is between about 7 and about 8.

Writing Instruments

Suitable writing instruments to deliver the erasable writing compositions include, but are not limited to, conventional ballpoint pens. The tip of a ballpoint pen suitable for use with compositions according to the invention has a ball having a diameter between 0.3 mm and 2.0 mm. The ball is in direct contact with a fluid reservoir containing the writing composition. The clearance between the point opening and the ball must be of sufficient size to allow the pigment particles of the erasable inks according to the invention to pass through the point. Preferably, the clearance is at least about 100 microns; more preferably, at least about 25 microns. The ball is made from a group of materials which includes sintered hard alloys, ceramics, and resins. The point material is selected from materials including stainless steel, nickel silver, brass, and molded resins. The point can also contain a spring which contacts the ball and presses it against the inner edge of the front of the point until the force of writing pushes the ball back. Such ballpoint pens having a spring are described in U.S. Pat. No. 5,929,135, the entire disclosure of which is herein incorporated by reference. Other examples of ballpoint pens (without springs) which may be used with the writing composition are the PaperMate Gel Stick pen (Sanford, Bellwood, Illinois) and the uni-ball Signo gel ink pen (Mitsubishi Pencil Co., Ltd., Japan).

Methods of Measuring Writing Performance

The erasability of the erasable inks can be evaluated by manual erasure and visual observation, but this involves personal factors such as applied pressure and size of surface being erased. A more accurate evaluation can be conducted by applying the trace to the substrate via a standard writing test method in which the paper is advanced beneath a writing instrument at a rate of 245 mm per minute. The paper is removed and placed on an erasing instrument including an erasing head provided with a Sanford (Bellwood, Ill.) Pink Pearl pencil eraser #101 (Shore A34 hardness, ASTM D 2240). The erasing head is applied under a load of 380 grams to the paper bearing the trace. The eraser has a surface measuring 7 mm by 3 mm. The erasing head reciprocates at a rate of 75 cycles per minute, the length of each stroke being 50 mm. Each trace is subjected to 25 cycles of erasing which can be visually observed or rated by photometer readings. Once a trace has been applied to the substrate with the writing instrument, the applied trace is left to air dry at room temperature for about five minutes prior to erasing the trace with the erasing head. The photometer readings can be recorded on a reflectometer such as a MacBeth PCM II reflectometer.

The erasability ($E_{tot}$) can be determined by recording the reflectance of each erased line ("Reflectance of Erased Line") and the reflectance of the paper without any marking ("Blank Reflectance") and calculating the ratio of Reflectance of Erased Line to Blank Reflectance, i.e., $E_{tot}$-(Erased Line/Blank). The percent erasability is calculated by multiplying $E_{tot}$, by 100.

The intensity of the marking can be determined by recording the reflectance of the marking ("Reflectance of Marking") and calculating the difference between the Blank Reflectance and the Reflectance of Marking. The percent intensity of the marking is calculated by normalizing the calculated intensity difference to the Blank Reflectance and multiplying this value by 100. A black standard has an intensity of marking equal to 100%.

Line uniformity of a marking can be determined by calculating the intensity of the marking at several different portions of the marking and determining the standard deviation of the intensity of the marking based upon the measured intensities. Line uniformity is inversely proportional to the standard deviation of the intensity, i.e., a lower standard deviation of the intensity corresponds to a higher line uniformity.

The invention can be better understood in light of the following examples which are intended as an illustration of the practice of the invention and are not meant to limit the scope of the invention in any way.

EXAMPLE 1

Formulations for Erasable Shear-Thinning Pearlescent Inks

Samples were formulated in small quantities of 15–30 mL according to the component weight percentages listed in Table 1. The mixing procedure was performed by first combining all ingredients except the propylene glycol, xanthan gum and 2 mL of the total water in a 50 mL polypropylene centrifuge tube. The tube was capped and was manually shaken. The tube was then horizontally attached to a Vortex-Genie 2 mixer (Fisher Scientific Company, Pittsburgh, Pa.) for five minutes of high-speed vortexing. The propylene glycol and xanthan gum were combined in a second tube. The second tube was manually shaken to ensure that the xanthan gum was dispersed in the propylene glycol. After five minutes of high-speed vortexing, the contents of the first tube were added to the second tube. The remaining 2 1 mL of water was added to the first tube, which was recapped and shaken well. This rinse water of the first tube was then added to the second tube. The second tube was capped, shaken by hand, and then attached horizontally to the mixer apparatus. For a 15 mL sample, the tube was first vortexed for 5 minutes, at which point the mixing was interrupted to scrape the sides with a Pasteur pipette. The tube was subsequently vortexed for 10 additional minutes. For a 30 mL sample, the tube was first vortexed for 10 minutes, at which point the mixing was interrupted to scrape the sides with a Pasteur pipette. The tube was subsequently vortexed for 15 additional minutes. After the vortexing was completed, the tube was placed in a centrifuge (IEC PR-7000M, International Equipment Company, Needham Heights, Mass.) and spun at 100 G for 1.5 minutes to help release air bubbles. The tube was then left undisturbed for a period of time not exceeding 24 hours. Before the shear-thinning composition was used, the tube was centrifuged as needed at 100 G for 1.5 minutes.

In the formulations set forth in Table 1, the pearlescent pigments (EM Industries, Inc., Hawthorne, N.Y.; and Rona business unit of EM Industries) had been sieved in the laboratory and were from a 5–15 micron cut. The graphite flake was Micro790 (Asbury Graphite Mills, Asbury, N.J.) which had been processed by Hosokawa Micron Powder Systems (Summit, N.J.) to an average diameter of 7.8 microns (std. dev.=3.7 microns) with about 0.1% by volume greater than 20 microns and about 2% by volume less than 2 microns. The lubricious particles were Microslip 519 micronized polytetrafluoroethylene powder (Presperse, Inc., Piscataway, N.J.) with a mean particle size of 5.0–6.0 microns. The shear-thinning additive was xanthan gum (Keltrol CG, Kelco Biopolymers, San Diego, Calif.), the dispersants and wetting agents were Disperbyk D-192 and BYK-345 (BYK-Chemie USA, Wallingford, Conn.) and Emerest 2646 (Cognis Corporation, Cincinnati, Ohio), the preservative was Proxel GXL (19.3% by weight solution in dipropylene glycol and water from Avecia Biocides, Wilmington, Del.), the water-soluble organic solvent was propylene glycol (Fisher Scientific Company, Pittsburgh, Pa.), and the water was deionized water.

TABLE 1

Formulations for Erasable Shear-Thinning Pearlescent Inks

Component Weight %

| Sample | Color | Pigment Type | Pigment | Xanthan Gum | Microslip 519 | Disperbyk -192 | BYK -345 | Emerest 2646 | Proxel GXL | Propylene Glycol | Water |
|---|---|---|---|---|---|---|---|---|---|---|---|
| A | Red | Afflair 9525 | 13.0 | 0.55 | 6.5 | 0.50 | 0.50 | 0.50 | 0.05 | 18.0 | 60.40 |
| B | Red | Afflair 9525 | 13.0 | 0.55 | 3.0 | 0.50 | 0.50 | 0.50 | 0.05 | 18.0 | 63.90 |
| C | Red | Afflair 9525 | 13.0 | 0.50 | 6.5 | 0.50 | 0.50 | 0.50 | 0.05 | 18.0 | 60.45 |
| D | Red | Afflair 9525 | 13.0 | 0.50 | 3.0 | 0.50 | 0.50 | 0.50 | 0.05 | 18.0 | 63.95 |
| E | Gold | Afflair 9323 | 13.0 | 0.50 | 6.5 | 0.50 | 0.50 | 0.50 | 0.05 | 18.0 | 60.45 |
| F | Gold | Afflair 9323 | 13.0 | 0.50 | 3.0 | 0.50 | 0.50 | 0.50 | 0.05 | 18.0 | 63.95 |
| G | Gold | Afflair 9323 | 13.0 | 0.45 | 6.5 | 0.50 | 0.50 | 0.50 | 0.05 | 18.0 | 60.50 |
| H | Gold | Afflair 9323 | 13.0 | 0.45 | 3.0 | 0.50 | 0.50 | 0.50 | 0.05 | 18.0 | 64.00 |
| I | Blue | Colorona Dark Blue | 13.0 | 0.55 | 6.5 | 0.50 | 0.50 | 0.50 | 0.05 | 18.0 | 60.40 |
| J | Blue | Colorona Dark Blue | 13.0 | 0.50 | 6.5 | 0.50 | 0.50 | 0.50 | 0.05 | 18.0 | 60.45 |
| K | Blue | Colorona Dark Blue | 13.0 | 0.50 | 3.0 | 0.50 | 0.50 | 0.50 | 0.05 | 18.0 | 63.95 |
| L | Blue | Colorona Dark Blue | 13.0 | 0.45 | 6.5 | 0.50 | 0.50 | 0.50 | 0.05 | 18.0 | 60.50 |
| M | Green | Dichrona BG | 13.0 | 0.45 | 5.0 | 0.50 | 0.50 | 0.50 | 0.05 | 18.0 | 58.00 |
|  |  | Graphite M790 | 4.0 |  |  |  |  |  |  |  |  |

TABLE 1-continued

Formulations for Erasable Shear-Thinning Pearlescent Inks

| | | | Component Weight % | | | | | | | |
|---|---|---|---|---|---|---|---|---|---|---|
| Sample | Color | Pigment Type | Pigment | Xanthan Gum | Microslip 519 | Disperbyk -192 | BYK -345 | Emerest 2646 | Proxel GXL | Propylene Glycol | Water |
| N | Green | Dichrona BG | 13.0 | 0.45 | 5.0 | 0.50 | 0.50 | 0.50 | 0.05 | 18.0 | 59.00 |
|   |       | Graphite M790 | 3.0 | | | | | | | | |
| O | Green | Dichrona BG | 13.0 | 0.40 | 5.0 | 0.50 | 0.50 | 0.50 | 0.05 | 18.0 | 58.05 |
|   |       | Graphite M790 | 4.0 | | | | | | | | |
| P | Green | Dichrona BG | 13.0 | 0.40 | 5.0 | 0.50 | 0.50 | 0.50 | 0.05 | 18.0 | 59.05 |
|   |       | Graphite M790 | 3.0 | | | | | | | | |

EXAMPLE 2

Power Law Parameters for Erasable Shear-Thinning Pearlescent Inks

The apparent viscosity ($\mu$) of each sample was determined at 25° C. with a Carri-Med CSL$^2$-500 Rheometer (TA Instruments, New Castle, Del.). The instrument used a cone-and-plate geometry with a stainless steel cone having a 4-cm diameter and a 2-degree angle. A small amount of sample (0.7 mL) was sheared within a 69 micron gap at a shear rate ($\gamma$) ramping between 0.05 and 1000 sec$^{-1}$ in 3 minutes. The shear stress ($\tau$) was determined from the torque required to drive the cone, and the apparent viscosity was calculated from $\mu=\tau/\gamma$ where $\mu$ is in units of Pa·sec, $\tau$ is in N·m$^2$, and $\gamma$ is in sec$^{-1}$.

For each sample, the measured viscosities were fit to the shear rates using the two parameter Ostwald-de Waele or power law model $\mu=K\gamma^{n-1}$ where n is the flow behavior index (or a shear-thinning index when n<1) and K is the power law coefficient (kg·m$^{-1}$·sec$^{n-2}$). The power law model provides a good fit for shear-thinning fluids (n<1) at intermediate shear rates over a range of one to two orders of magnitude. The model does not describe viscosity well at very low or very high shear rates.

After examination of the data for the samples of Table 1, the power law model was fit to the viscosities between shear rates of 1.0 sec$^{-1}$ and 100 sec$^{-1}$. The resulting values of K and n are given in Table 2, together with the calculated values of apparent viscosity for shear rates of 1.0 sec$^{-1}$, 30 sec$^{-1}$, and 100 sec$^{-1}$. R-squared values were better than 0.99 for all regressions set forth in Table 2.

TABLE 2

Power Law Parameters for Erasable Shear-Thinning Pearlescent Inks

| Sample | Color | K Power Law Coefficient (kg · m$^{-1}$ · s$^{n-2}$) | n Shear-Thinning Index | Viscosity (mPa.s) | | |
|---|---|---|---|---|---|---|
| | | | | 1.0 s$^{-1}$ | 30 s$^{-1}$ | 100 s$^{-1}$ |
| A | Red | 5.11 | 0.188 | 5,110 | 322 | 121 |
| B | Red | 4.93 | 0.172 | 4,930 | 295 | 109 |
| C | Red | 5.02 | 0.179 | 5,020 | 307 | 114 |
| D | Red | 4.60 | 0.173 | 4,600 | 277 | 102 |
| E | Gold | 6.73 | 0.154 | 6,730 | 379 | 137 |
| F | Gold | 6.21 | 0.141 | 6,210 | 335 | 119 |
| G | Gold | 5.98 | 0.154 | 5,980 | 336 | 121 |
| H | Gold | 5.76 | 0.141 | 5,760 | 310 | 110 |
| I | Blue | 7.93 | 0.143 | 7,930 | 430 | 153 |
| J | Blue | 7.35 | 0.137 | 7,350 | 391 | 138 |
| K | Blue | 4.32 | 0.226 | 4,320 | 311 | 122 |
| L | Blue | 6.53 | 0.140 | 6,530 | 351 | 125 |
| M | Green | 7.58 | 0.170 | 7,580 | 451 | 166 |
| N | Green | 7.31 | 0.162 | 7,310 | 423 | 154 |
| O | Green | 6.57 | 0.181 | 6,570 | 406 | 151 |
| P | Green | 6.06 | 0.177 | 6,060 | 369 | 137 |

EXAMPLE 3

Line Width, Intensity, and Erasability Values for Pearlescent Inks

An internal panel test was run with twelve subjects (6 men/6 women) using a set of four pens containing red, gold, blue, and green writing compositions. These compositions were made according to selected formulations in Table 1. Red was Sample A, gold was Sample F with Microslip 519L (mean particle size 11.0–13.0 microns) in place of Microslip 519, blue was Sample J, and green was Sample P. The pens were constructed with recycled bodies and points from commercial metallic gel pens having 1-mm points. A refill containing the writing composition was inserted into each pen body. Four refills of each color were characterized by laydown measurements before the start of the test, and the average values are listed in Table 3 for reference.

During the test, four sets of four pens were used, with the order of the colors varied in each set. With twelve panelists in the test, each set was eventually used by three individuals. The subjects wrote with each pen on a five-minute exercise which included writing six sentences and drawing two lines. One of the sentences was erased immediately after completing (about 5 to 10 seconds), and a second sentence was erased after about 2 to 3 minutes. A Pink Pearl eraser (Sanford Corporation, Bellwood, Ill.) was used for all erasures. The tracings and erasures were analyzed by image analysis.

The image analysis system consisted of a light table with 250 W photoflood lamps (Wiko, Orland Park, Ill.), a Sony DCR-VX1000 digital video camera recorder (Sony Corporation, Japan), and Optimas Version 6.5 software (Media Cybernetics, Silver Spring, Md.). For the erasability measurements, the 24-bit RGB images were analyzed directly; for the line width and intensity measurements, the colored images were converted to 8-bit grayscale images.

The line width of a product was calculated from the measured values of area and perimeter for the detected tracings using the equation $$\text{Line Width} = (2 * \text{Area}) / ([\text{Perimeter}]^2 - 4 * \text{Area})^{0.5}$$

The results were averaged for two sentences and two lines for each subject and then averaged across all panelists.

The intensity of a product was measured as the average gray value of the detected tracings (black=0; white=255). The percent intensity of the writing with an average gray value of z was then calculated as $$\% \text{ Intensity} = (1 - [z/255]) * 100$$

Similar to the procedure for line width, results were averaged for two sentences and two lines for each subject and then averaged across all panelists.

The erasability of a product was defined as the ability to recover the gray level reading of the blank paper by removing the written tracings with an eraser. The percent erasability was calculated as $$\% \text{ Erasability} = (z / z_o) * 100$$

where z is the average gray value of the erased section and $z_o$ is the average gray value of the blank section of paper. For each panelist, erasability was determined for the immediate "5–10 seconds" erasing example and for the longer "2–3 minutes" erasing example. A blank paper region was measured before and after each erasing region, and the average of these blank regions was used to divide the measurement for the erasing region.

The calculated values for line width, intensity, and erasability are tabulated in Table 3 for the red, gold, blue, and green writing compositions. The results show that some improvement in erasability can be achieved by lowering the laydown of the writing composition; however, the laydown cannot be so low that the intensity and the line width are unacceptable. The results also show that the erasability of the writing composition improves after waiting a small amount of time before erasing. Although this specific test had more than 2 minutes of elapsed time, subsequent tests have shown that 15 to 20 seconds is probably the minimum time needed with writing compositions having laydowns in the range of 7 to 9 mg/m.

Typically, for the intensity of pearlescent writing compositions, the preferred value is greater than 25%, the more preferred value is greater than 30%, and the most preferred value is greater than 40%.

For the erasability of pearlescent writing compositions, the preferred value is greater than 80%, the more preferred value is greater than 90%, and the most preferred value is greater than 95%.

For the laydown of pearlescent writing compositions, the preferred value is between 0.1 mg/m and 15 mg/m, the more preferred value is between 1 mg/m and 12 mg/m, and the most preferred value is between 5 mg/m and 10 mg/m.

TABLE 3

Image Analysis Results for Line Width, Intensity, and Erasability of Pearlescent Inks Using Pens with 1-mm Points

| Sample | Color | Laydown mg/m | Line Width (mm) Sentences | Lines | % Intensity Sentences | Lines | % Erasability 5–10 sec | 2–3 min |
|---|---|---|---|---|---|---|---|---|
| A | Red | 8.4 | 0.67 | 0.51 | 48.3 | 55.6 | 95.0 | 98.0 |
| F | Gold | 6.8 | 0.54 | 0.39 | 42.3 | 45.4 | 98.3 | 99.4 |
| J | Blue | 8.4 | 0.67 | 0.48 | 46.1 | 50.8 | 94.0 | 97.4 |
| P | Green | 9.1 | 0.72 | 0.55 | 47.7 | 54.3 | 93.8 | 96.8 |

EXAMPLE 4

Formulations for Erasable Shear-Thinning Graphite Inks

Samples were formulated in small quantities of 15–30 mL according to the component weight percentages listed in Table 4. The same mixing procedure was used as described in Example 1.

In the formulations set forth in Table 4, the graphite particles used were Micro790 (Asbury Graphite Mills, Inc. Asbury, N.J.) which had been processed by Hosokawa Micron Powder Systems (Summit, N.J.) to an average diameter of 7.8 microns (std. dev.=3.7 microns), the shear-thinning additive was xanthan gum (Keltrol CG, Kelco Biopolymers, San Diego, Calif.), the dispersant was Disperbyk-192 (BYK-Chemie USA, Wallingford, Conn.), and the wetting agents were BYK-345 (BYK-Chemie USA, Wallingford, Conn.) and Emerest 2646 (Cognis Corporation, Cincinnati, Ohio), the preservative was Proxel GXL (19.3 weight percent solution in dipropylene glycol and water) (Avecia Biocides, Wilmington, Del.), the water-soluble organic solvent was glycerol and/or propylene glycol (both available from Fisher Scientific Company, Pittsburgh, Pa.), and the water was deionized water.

TABLE 4

Formulations for Erasable Shear-Thinning Graphite Inks

Component Weight Percent

| Sample | Graphite | Xanthan Gum | Disperbyk -192 | BYK -345 | Emerest 2646 | Proxel GXL | Glycerol | Propylene Glycol | $H_2O$ |
|---|---|---|---|---|---|---|---|---|---|
| A | 10.0 | 0.55 | 0.50 | 0.50 | 0.50 | 0.05 | — | 18.0 | 69.90 |
| B | 10.0 | 0.65 | 0.50 | 0.50 | 0.50 | 0.05 | — | 18.0 | 69.80 |
| C | 10.0 | 0.75 | 0.50 | 0.50 | 0.50 | 0.05 | — | 18.0 | 69.70 |
| D | 10.0 | 0.85 | 0.50 | 0.50 | 0.50 | 0.05 | — | 18.0 | 69.60 |
| E | 10.0 | 0.55 | 0.50 | 0.50 | 0.50 | 0.05 | — | 12.0 | 75.90 |
| F | 10.0 | 0.85 | 0.50 | 0.50 | 0.50 | 0.05 | — | 12.0 | 75.60 |
| G | 10.0 | 0.55 | 0.50 | 0.50 | 0.50 | — | — | 18.0 | 69.95 |
| H | 10.0 | 0.55 | 0.50 | 0.50 | 0.50 | — | 8.0 | 10.0 | 69.95 |
| I | 10.0 | 0.55 | 0.50 | 0.50 | 0.50 | — | — | 22.0 | 65.95 |
| J | 10.0 | 0.55 | 0.50 | 0.50 | 0.50 | — | 4.0 | 18.0 | 65.95 |

EXAMPLE 5

Power Law Parameters for Erasable Shear-Thinning Graphite Inks

After examination of the data for the samples of Table 4, the power law model was fit to the viscosities between shear rates of 1.0 $sec^{-1}$ and 100 $sec^{-1}$ (see Example 2). The resulting values of K and n are given in Table 5, together with the calculated values of apparent viscosity for shear-rates of 1.0 sec, 30 $sec^{-1}$, and 100 $sec^{-9}$. R-squared values were better than 0.999 for all regressions set forth in Table 5.

TABLE 5

Power Law Parameters for Erasable Shear-Thinning Graphite Inks

| Sample | K Power Law Coefficient ($kg \cdot m^{-1} \cdot s^{n-2}$) | n Shear-Thinning Index | Viscosity (mPa.sec) | | |
|---|---|---|---|---|---|
| | | | 1.0 $sec^{-1}$ | 30 $sec^{-1}$ | 100 $sec^{-1}$ |
| A | 7.93 | 0.149 | 7930 | 439 | 157 |
| B | 9.50 | 0.150 | 9500 | 528 | 190 |
| C | 10.8 | 0.153 | 10,800 | 608 | 219 |
| D | 11.9 | 0.159 | 11,900 | 685 | 249 |
| E | 7.10 | 0.160 | 7100 | 408 | 148 |
| F | 11.6 | 0.156 | 11,600 | 659 | 239 |
| G | 7.63 | 0.162 | 7630 | 441 | 161 |
| H | 7.80 | 0.160 | 7800 | 448 | 163 |
| I | 8.10 | 0.155 | 8100 | 457 | 165 |
| J | 8.35 | 0.158 | 8350 | 477 | 173 |

EXAMPLE 6

Intensity and Erasability Values for Graphite Inks

A test was conducted with thirteen subjects (5 men/8 women) using three writing products to compare the erasability and the line intensity of writing compositions and writing instruments according to the invention with commercially-available writing products. The writing instrument according to the invention contained an erasable, shear-thinning writing composition (Sample G of Table 5) and a 0.8-mm point. The performance of this instrument was compared with the Sanford Mirado pencil (No. 2 HB lead) and the Sanford Clickster mechanical pencil (0.7-mm HB lead). The subjects used each product on a five-minute exercise which included writing 10 sentences and filling in 10 circles. The tracings were analyzed by image analysis.

After the measurements were completed, the exercises were redistributed to thirteen different panelists. Each subject was asked to erase one sentence on each exercise using a Sanford Pink Pearl eraser. The erased section and an adjacent blank section were analyzed by image analysis. The image analysis system was the same setup described in Example 3.

The results for the line intensity and the erasability were averaged for the thirteen panelists and are presented in Table 6.

TABLE 6

Image Analysis Results for Intensity and Erasability of Graphite Inks Using Pens with 0.8-mm Points

| Writing Instrument | % Intensity | | % Erasability |
|---|---|---|---|
| | Circles | Sentences | |
| Pencil (No. 2 HB lead) | 49.8 | 39.6 | 97.9 |
| Mechanical Pencil (0.7-mm RB lead) | 52.2 | 41.2 | 97.8 |
| Writing instrument containing Sample G | 51.4 | 37.6 | 97.4 |

Although the present invention has been described in considerable detail with reference to certain preferred versions thereof, other versions are possible. Therefore, the spirit and scope of the appended claims should not be limited to the description of the preferred versions contained herein.

What is claimed is:

1. An erasable ink for use in a writing instrument, comprising:
    a solvent, and
    a pigment having a flake morphology dispersed in the solvent, wherein the ink is substantially free of colorants other than said pigment and said pigment is selected from the group consisting of pearlescent pigments, mica flake pigments, glass flake pigments, and metal flake pigments.
2. The ink of claim 1 wherein said pigment is a pearlescent pigment.
3. The ink of claim 1 wherein said pigment is selected from the group consisting of mica flake pigments, and metal flake pigments.
4. The ink of claim 1 wherein said pigment has an average diameter from about 1 micron to about 25 microns.
5. The ink of claim 1 wherein said ink exhibits an erasability of at least about 80%.

6. The ink of claim 1 wherein said solvent comprises an aqueous solvent system.

7. The ink of claim 1 wherein said ink has a shear-thinning index of between about 0.01 and about 0.8.

8. An erasable ink for use in a writing instrument, comprising:
   a solvent, and
   a flake pigment having an average diameter from about 1 micron to about 25 microns dispersed in the solvent, wherein said pigment is selected from the group consisting of pearlescent pigments, mica flake pigments, glass flake pigments, and metal flake pigments.

9. The ink of claim 8 wherein said pigment is a pearlescent pigment.

10. The ink of claim 8 wherein said pigment is selected from the group consisting of mica flake pigments, and metal flake pigments.

11. The ink of claim 8 wherein said ink exhibits an erasability of at least about 80%.

12. The ink of claim 8 wherein said solvent comprises an aqueous solvent system.

13. The ink of claim 8 wherein said ink has a shear-thinning index of between about 0.01 and about 0.8.

14. An erasable ink for use in a writing instrument, comprising:
   a solvent, and
   a flake pigment having an average thickness of less than about 1 micron dispersed in the solvent, wherein said pigment is selected from the group consisting of pearlescent pigments, mica flake pigments, glass flake pigments, and metal flake pigments.

15. The ink of claim 14 wherein said pigment is a pearlescent pigment.

16. The ink of claim 14 wherein said pigment is selected from the group consisting of mica flake pigments and metal flake pigments.

17. The ink of claim 14 wherein said pigment has an average diameter from about 1 micron to about 25 microns.

18. The ink of claim 14 wherein said ink exhibits an erasability of at least about 80%.

19. The ink of claim 14 wherein said solvent comprises an aqueous solvent system.

20. The ink of claim 14 wherein said ink has a shear-thinning index of between about 0.01 and about 0.8.

21. A method of forming an erasable marking on a paper substrate, comprising:
   making a marking on the substrate with a writing instrument containing an erasable ink comprising a solvent and a pigment having a flake morphology dispersed in the solvent, wherein the ink is substantially free of colorants other than said pigment and said pigment is selected from the group consisting of pearlescent pigments, mica flake pigments, glass flake pigments, and metal flake pigments.

22. A method of forming an erasable marking on a paper substrate, comprising:
   making a marking on the substrate with a writing instrument containing an erasable ink comprising a solvent and a flake pigment having an average diameter from about 1 micron to about 25 microns dispersed in the solvent, wherein said pigment is selected from the group consisting of pearlescent pigments, mica flake pigments, glass flake pigments, and metal flake pigments.

23. A method of forming an erasable marking on a paper substrate, comprising:
   making a marking on the substrate with a writing instrument containing an erasable ink comprising a solvent and a flake pigment having an average thickness of less than about 1 micron dispersed in the solvent, wherein said pigment is selected from the group consisting of pearlescent pigments, mica flake pigments, glass flake pigments, and metal flake pigments.

24. A writing instrument, comprising:
   a reservoir containing an erasable ink comprising a solvent and a pigment having a flake morphology dispersed in the solvent, wherein the ink is substantially free of colorants other than said pigment and said pigment is selected from the group consisting of pearlescent pigments, mica flake pigments, glass flake pigments, and metal flake pigments.

25. A writing instrument, comprising:
   a reservoir containing an erasable ink comprising a solvent and a flake pigment having an average diameter from about 1 micron to about 25 microns dispersed in the solvent, wherein said pigment is selected from the group consisting of pearlescent pigments, mica flake pigments, glass flake pigments, and metal flake pigments.

26. A writing instrument, comprising:
   a reservoir containing an erasable ink comprising a solvent and a flake pigment having an average thickness of less than about 1 micron dispersed in the solvent, wherein said pigment is selected from the group consisting of pearlescent pigments, mica flake pigments, glass flake pigments, and metal flake pigments.

27. The ink of claim 1 wherein said pigment is selected from the group consisting of mica flake pigments, glass flake pigments, and metal flake pigments.

28. The ink of claim 1 wherein said pigment has an aspect ratio of between about 1 and about 8.

29. The ink of claim 8 wherein said pigment has an aspect ratio of between about 1 and about 8.

30. The ink of claim 14 wherein said pigment has an aspect ratio of between about 1 and about 8.

* * * * *